Dec. 15, 1964  S. RUBEN  3,161,545
RECHARGEABLE CELL AND ELECTRODE THEREFOR
Filed July 13, 1960
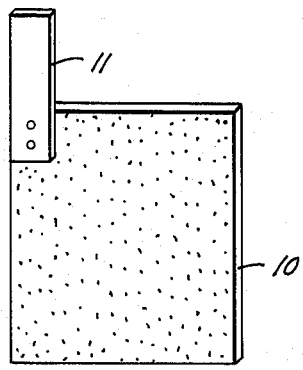
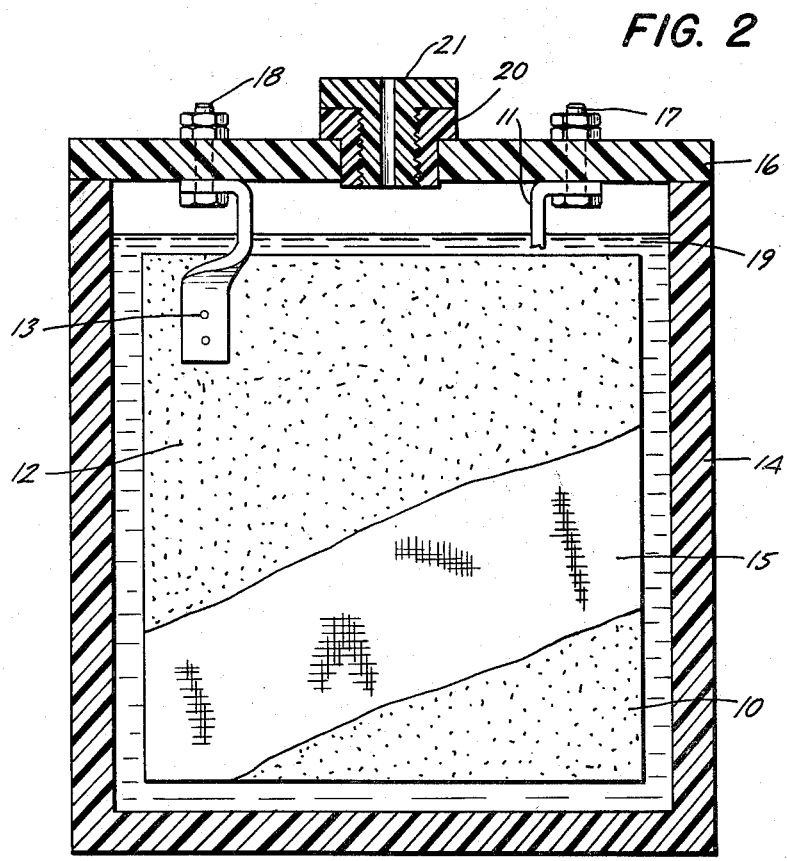
INVENTOR.
SAMUEL RUBEN
BY
ATTORNEY United States Patent Office 3,161,545
Patented Dec. 15, 1964

3,161,545
RECHARGEABLE CELL AND ELECTRODE THEREFOR
Samuel Ruben, 52 Seacord Road, New Rochelle, N.Y.
Filed July 13, 1960, Ser. No. 42,629
17 Claims. (Cl. 136—20)

This invention relates to rechargeable cells and, more particularly, to an improved electrode for alkaline rechargeable cells or storage batteries.

The present application is a continuation-in-part of my co-pending application Serial No. 638,391, filed February 5, 1957, entitled "Manganese-Cadmium Storage Battery," and now abandoned.

It is an object of the present invention to improve rechargeable cells.

It is another object of the invention to provide rechargeable alkaline cell systems, which permit the construction of cells of large and small size in various shapes, which can be sealed and which will withstand repeated charge and discharge over long periods of time without deterioration.

A specific object of the invention is the provision of an alkaline storage battery of lower weight than the storage batteries presently used.

It is also within contemplation of the invention to provide a novel and improved electrode for rechargeable cells.

The invention also contemplates a novel cathode electrode comprising manganese which can be advantageously combined with anode electrodes comprising cadmium, or zinc to constitute an alkaline rechargeable cell of improved characteristics.

Other and further objects and advantages of the present invention will become apparent from the following description, taken in conjunction with the accompanying drawing; in which:

FIG. 1 is a perspective view of a cathode electrode embodying the invention; and FIG. 2 is a vertical sectional view, having parts in elevation and parts broken away for reasons of clarity, of a rechargeable cell incorporating the type of cathode shown in FIG. 1.

Broadly stated, I have discovered that titanium, due to its light weight, chemical inertness and polarizing character provides an excellent supporting element or base for a coating of manganese dioxide produced by reaction of a thermally decomposable compound of manganese, such as manganese nitrate, heated to its decomposition temperature, which in the case of manganous nitrate is about 250° C. Such a pyrolytically produced coating of manganese dioxide will strongly adhere and will be tenaciously bonded to the titanium base.

I have found that the potential of a cell made with titanium electrode substituted for carbon or graphite as a base for a cathode in an alkaline electrolyte cell is the same. However, if such an electrode is used in a rechargeable cell, upon charging, the titanium, due to its film-forming characteristics, becomes anodized, and a high resistance layer of titanium oxide will be formed between the titanium base and the oxide. This has been found to occur with both acid electrolytes and alkaline electrolytes. While this difficulty can be avoided by first completely coating the titanium with graphite, in that case the titanium will merely function as a mechanical support for the graphite and the operation of such graphite-coated titanium electrode will be in no way different from that of an electrode made of graphite in its entirety.

I have further discovered that in order to utilize titanium effectively for a porous cathode whereby the active depolarizer can be completely impregnated through its structure, the titanium must be impregnated with manganous nitrate, which in the process of pyrolysis will react with the titanium and will form a non-polarizing integrally bonded coating on the surface of the pores, without destroying the intercommunicating and electrolyte-permeable character of the said pores.

The nitrate radical released at the time of pyrolysis, in accordance with the surface chemical reaction $Mn(NO_3)_2 + heat \rightarrow MnO_2 + 2NO_2$ is apparently the reactant for producing this non-polarizing layer in the complete absence of any titanium oxide film between the said $MnO_2$ layer and the underlying titanium base. This is of critical importance in constructing a rechargeable cell utilizing the reversible characteristics of manganese dioxide. If there are any portions of titanium which remain exposed due to unavoidable imperfections of the manganese dioxide layer, such surface portions will be coated with a polarizing layer of titanium oxide and thus will be effectively insulated from the electrolyte. This will reduce local or shelf discharge of the active depolarizer. Also, it allows more efficient charging because the flow of current will be localized on the manganese dioxide surface, eliminating free oxygen discharge and the waste of charging current at the inactive surface portions.

In practicing the preferred form of the invention, the porous titanium plaque is made by filling titanium powder into a $\frac{1}{16}''$ deep cavity in a graphite block, leveling the powder off, and then heating the block with the body of titanium powder therein in a vacuum furnace to the sintering temperature between 1190° C. and 1275° C. for a suitable period which may be about 30 minutes at 1250° C. and correspondingly longer at lower sintering temperatures. Obviously, the depth of the cavity may be varied in accordance with the desired thickness of the titanium plaque. This procedure, carried out in the absence of pressing the powder prior to sintering, yields a strongly coherent unitary body characterized by uniformly distributed interconnected pores, the porosity being in the order of 60%. After sintering, leads of titanium strip are spot-welded to the porous titanium plaque which is then impregnated with an aqueous solution of manganous nitrate having a concentration of 20% to 50%, preferably of 50%. The impregnated plaque is then heated to 250° C. until all of the nitrate has decomposed and a tough, integrally bonded coating is obtained in and on the titanium plaque. This cycle is repeated until the maximum amount of manganese dioxide is formed throughout the porous mass of titanium without interfering with the intercommunicating character of the pores.

In a practical case, an actual sieve analysis of the titanium powder has shown 0% plus 100 mesh, 8.2% minus 100 mesh plus 200 mesh, 88.8% minus 200 mesh plus 325 mesh and 30% minus 325 mesh. The Fisher number of the powder was found to be 21.0 and the Scott apparent density was 22.9 grams/in.$^3$. The pressure during sintering in the vacuum furnace ranged from 0.4 micron down to 0.06 micron during the time the titanium powder was at sintering temperature.

Although the described process avoiding compression of the titanium powder before sintering appears to yield maximum porosity, porous titanium plaques may also be made by conventional powder metallurgical procedures comprising pressing and sintering steps. In that case, the porosity can be increased by adding a volatile binder to the powder, such as an alkyd resin, which decomposes without leaving a carbonized mass.

I have observed that if it is attempted to produce a coating of manganese dioxide in a porous titanium plaque by electrolytic deposition, such as by making the plaque the anode in a solution of manganese sulfate and sulfuric acid, the titanium would polarize on its surface, preventing formation of an integral coating. Furthermore, due to the potential drop below the surface of the porous plaque, whatever deposition is had would be only on the outer surface of the plaque. I have also noted that if an acid manganese salt is impregnated in a porous titanium base and the manganese dioxide chemically precipitated by contact with an alkaline solution, the manganese dioxide formed is only in loose contact with the titanium and polarization will occur preventing efficient utilization of the manganese dioxide. In contrast to this, when, in accordance with the present invention, the manganese dioxide is formed by pyrolytic decomposition of manganous nitrate, the entire porous titanium mass is uniformly coated with manganese dioxide, which is chemically reacted with the titanium base to produce a non-polarizing layer. This makes it possible to produce a high capacity cathode for alkaline rechargeable cells.

Although a porous sintered titanium plaque is the preferred base for making the cathode electrodes of the invention, such plaque can be reinforced, if desired, by applying the titanium powder on to a titanium wire screen of about 10 mesh wire cloth woven from 0.15 mm. titanium wire. The titanium mass on the screen is then sintered in vacuum in the manner described in the foregoing. In addition to serving as a mechanical reinforcement, the screen may also provide a conductive lead for the plaque. It is also possible to pyrolytically deposit manganese dioxide from manganous nitrate directly on a close mesh titanium wire screen or even on a thin and non-porous sheet of titanium. Although the capacity of the cathodes formed directly on titanium screen or sheet is limited, such cathodes are useful for special applications.

The novel high-capacity cathode of the invention may be advantageously utilized in rechargeable cells in combination with various anodic materials, such as cadmium or zinc. Thus, a cadmium anode may be made by impregnating a porous base, such as a porous plaque formed and sintered from titanium powder, with cadmium hydroxide in any suitable manner. The anode can also be composed of zinc, which may be in the form of a plate pressed from amalgamated zinc powder or in the form of reducible zinc oxide with mercuric oxide impregnated into a porous metal base, such as a porous base of silver screen or silver-plated steel screen.

The principles of the invention are also applicable to the production of an improved electrode for rechargeable cells in which the active material is a compound of nickel. I have found that when using a porous titanium plaque as the base for nickel oxide, on charging, a polarization potential will be built up between the titanium base and the nickel oxide, which rapidly reduces the cell capacity and greatly increases the internal resistance of the cell. However, if the titanium plaque is first coated with manganese dioxide which is pyrolytically reduced from manganous nitrate and is reacted with the underlying titanium, a non-polarizing surface is provided. After this preparation, the porous plaque can be impregnated with a suitable nickel compound, such as nickel nitrate, followed by a solution of potassium hydroxide, to precipitate nickel hydroxide on the manganese dioxide-coated titanium surface. A nickel oxide cathode prepared in the described manner provides the advantages of a titanium base, while eliminating the disadvantages connected with the polarizing character of titanium, and can be advantageously utilized in a nickel-cadmium storage battery.

In general, of the anode metals cadmium and zinc, I prefer to use cadmium as it provides maximum cycleability in a rechargeable cell and it eliminates the problem of anode redeposition or reduction solution.

In order that those skilled in the art may have a better understanding of the invention, the invention will now be more fully described in connection with the structure and assembly of a manganese-cadmium rechargeable cell.

Referring more particularly to the drawing, numeral 10 denotes the cathode made by forming titanium powder into a rectangular plaque and sintering it in vacuum at a temperature of 1190° to 1250° C. until a strongly coherent, mechanically self-supporting body is obtained, characterized by a porosity of about 60% in the form of intercommunicating pores. A connecting tab 11 of the titanium sheet, 0.01″ thick, is spot-welded to the cathode plaque. The cathode is then impregnated in vacuum with a 50% aqueous solution of manganous nitrate. After impregnation, the plaque is heated to 250° C. until all of the manganous nitrate has been decomposed and a bonded layer of manganese dioxide is formed throughout the mass of the plaque. This procedure is repeated about 5 times in order to assure deposition of the maximum quantity of manganese dioxide in the porous titanium mass.

Anode plaque 12, having a connecting tab 13 spot-welded thereto, is likewise prepared by forming and sintering titanium powder. The porous anode plaque is vacuum-impregnated with a saturated solution of cadmium nitrate and is then immersed in a 25% solution of potassium hydroxide. A potential is applied to the plaque, such as to make it cathode in the potassium hydroxide electrolyte with respect to a graphite anode. The flow of current assists in diffusion of the decomposing alkaline solution and reduces loss of the insoluble cadmium hydroxide formed. The anode plaque thus produced is removed from the forming solution and is washed in hot water to eliminate the potassium nitrate formed in the reaction.

Cathode plaque 10 and anode plaque 12 are then inserted in a rectangular plastic container 14 and are separated from each other by a porous inert spacer layer 15, which may be woven nylon or Dynel cloth, commercially know as Polypor spacer. A plastic top closure plate 16, bearing terminal bolts 17 and 18, is cemented or otherwise secured to the open top of container 14 after the tabs 11 and 13 of plaques 10 and 12 have been connected to bolts 17 and 18, respectively. Container 14 is then filled with a suitable alkaline electrolyte 19, such as a 35% solution of potassium hydroxide, through filling opening 20 in top closure plate 16 and is closed with a vented cap 21.

While the cell employs a free-flowing electrolyte, the principles of the invention are equally applicable to so-called dry cells. In a dry cell structure, the spacer between cathode and anode is preferably an absorbent alkali-resistant cellulose sheet which is impregnated with the electrolyte. Such spacer immobilizes the electrolyte and retains an amount of electrolyte sufficient for electrolytic action in the absence of any mobile excess.

In the manganese-cadmium cell of the invention, the cell reactions appear to be:

On discharge—

$$Cd + 2MnO_2 + 2H_2O \xrightarrow{2\,\text{faradays}} Cd(OH)_2 + Mn_2O_3 + H_2O$$

On charge—

$$Mn_2O_3 + Cd(OH)_2 + H_2O \xrightarrow{2\,\text{faradays}} 2MnO_2 + Cd + 2H_2O$$

As noted from the above equation, operation of the cell involves a reversible action of electrochemically transferring oxygen from the cathode to the anode on discharge and the reverse on charge. Thus, the loss of electrolyte is very small, which makes it possible to provide a sealed container, if desired.

The lower weight of titanium and the high coulombic capacity of manganese dioxide as a depolarizer permits the construction of a rechargable cell having a higher ratio of capacity to weight than is obtainable with conventional nickel or lead-acid type storage batteries.

While I have specifically referred to the use of a potassium hydroxide electrolyte, other suitable electrolytes may be used, such as the less alkaline potassium, sodium or lithium phosphates. In this group, I prefer potassium ortho-phosphate, for example, a 30% solution of $K_3PO_4$.

Although the present invention has been disclosed in connection with preferred embodiments thereof, variations and modifications may be resorted to by those skilled in the art without departing from the principles of the invention. All of these variations and modifications are considered to be within the true spirit and scope of the present invention, as disclosed in the foregoing description and defined by the appended claims.

What is claimed is:

1. An electrode for electric current producing cells comprising a titanium base and a tough layer of pyrolytically produced manganese dioxide on said base and bonded thereto.

2. An electrode for alkaline cells comprising a base of titanium, and a tough deposit of pyrolytically produced manganese dioxide on said base and bonded thereto, said deposit and its bond with said base being the product of heating manganous nitrate in contact with the surface of said base to the decomposition temperature of manganous nitrate.

3. An electrode for rechargeable alkaline cells comprising a porous titanium plaque, and a tough coating of manganese dioxide tenaciously bonded to the surface of the pores of said plaque, said deposit and its bond with said titanium surface being the product of heating manganous nitrate in contact with said titanium surface to a temperature of about 250° C.

4. An electrode for an electrical battery comprising a porous sintered compact of titanium powder characterized by intercommunicating pores, and a tough coating of manganese dioxide tenaciously bonded to the internal surface of the pores of said compact, said coating and its bond with said titanium surface being the product of heating a manganese compound in contact with said titanium surface to a temperature at which thermal decomposition of said manganese compound takes place.

5. In combination with a rechargeable cell having an anode and an alkaline electrolyte, a cathode comprising a porous formed and sintered compact of titanium powder having intercommunicating voids, and a tough coating of manganese dioxide pyrolytically produced on and bonded to the surface of said voids, without intereferring with the intercommunicating character of said voids.

6. A rechargeable cell comprising, in combination, a cathode comprising a porous sintered compact having intercommunicating voids, and a tough coating of manganese dioxide pyrolytically produced on and bonded to the surface of said voids; an anode comprising metal selected from the group consisting of cadmium and zinc; and an alkaline electrolyte in contact with said cathode and said anode.

7. A rechargeable cell comprising two electrodes and an alkaline electrolyte; one of said electrodes comprising a porous titanium plaque impregnated with cadmium hydroxide; the other of said electrodes comprising a porous titanium plaque, and a tough deposit of manganese dioxide bonded to the internal surface of the pores of said plaque, said deposit and its bond with said titanium surface being the product of heating manganous nitrate in contact with said titanium surface to a temperature at which thermal decomposition of said manganous nitrate takes place.

8. A storage battery comprising an alkaline electrolyte; a negative electrode comprising a porous body of sintered titanium powder having cadmium hydroxide precipitated in the pores thereof; and a positive plate comprising a porous body of pressed and sintered titanium powder, and a tough deposit of manganese dioxide tenaciously bonded to the internal surface of the pores of said body, said deposit and its bond with said titanium surface being the product of heating manganous nitrate in contact with said titanium surface to a temperature at which thermal decomposition of said manganous nitrate takes place.

9. A storage battery comprising a container; an electrolyte of potassium hydroxide; a negative electrode comprising a porous plaque having a surface of titanium and having cadmium hydroxide impregnated in the pores thereof; and a positive plate comprising a screen having a surface of titanium, a sintered porous titanium mass supported by said screen, and a tough deposit of manganese dioxide in and tenaciously bonded to the internal surface of the pores of said mass, said deposit and its bond with said titanium surface being the product of heating manganous nitrate in contact with said titanium surface to a temperature at which thermal decomposition of said manganous nitrate takes place.

10. In a storage battery, the combination which comprises a container; an alkaline electrolyte; a negative electrode of which the active material is cadmium hydroxide; and a positive electrode comprising a porous titanium plaque, and a tough deposit of manganese dioxide tenaciously bonded to the internal surface of the pores of said plaque, said deposit and its bond with said titanium surface being the product of heating manganous nitrate in contact with said titanium surface to a temperature at which thermal decomposition of said manganous nitrate takes place.

11. A rechargeable cell comprising two electrodes and an alkaline electrolyte; one of said electrodes comprising zinc; the other of said electrodes comprising a porous titanium plaque, and a tough deposit of manganese dioxide bonded to the internal surface of the pores of said plaque, said deposit and its bond with said titanium surface being the product of heating manganous nitrate in contact with said titanium surface to a temperature at which thermal decomposition of said manganous nitrate takes place.

12. A storage battery comprising a container; an alkaline electrolyte in said container; and a pair of electrodes in said electrolyte; each of said electrodes comprising a porous body of sintered titanium powder; one of said electrodes having a cadmium compound in the pores thereof; and the other of said electrodes having its pores coated with a pyrolytically produced tough deposit of manganese dioxide and having a nickel compound in contact with said deposit.

13. The method of making an electrode for alkaline storage batteries which comprises applying manganous nitrate to the surface of a base of titanium, and heating said base to a temperature at which said manganous nitrate thermally decomposes thereby causing the formation of a tenaciously adherent tough coating of manganese dioxide on said base.

14. The method of making an electrode for alkaline storage batteries which comprises impregnating a porous titanium plaque with manganous nitrate, and heating said plaque to a temperature at which said manganous nitrate thermally decomposes thereby causing the formation of a tenaciously adherent tough coating of manganese dioxide on the internal surface of the pores of said plaque.

15. The method of making an electrode for alkaline storage batteries which comprises impregnating a sintered compact of titanium powder having intercommunicating pores with a solution of manganous nitrate, heating said impregnated compact to a temperature of about 250° C. thereby causing the formation of a tenaciously bonded tough coating of manganese dioxide on the internal surface of said pores, and repeating said impregnating and heating steps until sufficient manganese dioxide is formed in said pores without interfering with the intercommunicating character thereof.

16. The method of making an electrode for alkaline storage batteries which comprises impregnating a porous formed and sintered compact of titanium powder with manganous nitrate, heating said impregnated compact to a temperature of about 250° C. thereby causing the formation of a tenaciously bonded tough coating of manganese dioxide on the internal surface of said pores, and then depositing active material constituted by a nickel compound in said pores in contact with the manganese dioxide coating thereon.

17. A rechargeable cell comprising, in combination, a cathode comprising a metal base having a tough coating of manganese dioxide pyrolytically produced on and bonded to the surface thereof; an anode comprising metal selected from the group consisting of cadmium and zinc; and an electrolyte selected from the group consisting of akali metal hydroxides and alkali metal phosphates.

References Cited in the file of this patent

UNITED STATES PATENTS

| | | |
|---|---|---|
| 1,064,211 | Heil | June 10, 1913 |
| 2,007,170 | Bacsa | July 9, 1935 |
| 2,631,115 | Fox | Mar. 10, 1953 |
| 2,678,343 | Daniel | May 11, 1954 |
| 2,952,572 | Heuninckx | Sept. 13, 1960 |